United States Patent

Mukai et al.

[11] Patent Number: 6,037,418
[45] Date of Patent: Mar. 14, 2000

[54] RESIN-REINFORCED ELASTOMER, PROCESS FOR PRODUCING SAME AND PNEUMATIC TIRE USING SAME

[75] Inventors: Uchu Mukai, Tokyo; Naomi Okamoto, Chiba-ken, both of Japan

[73] Assignees: Bridgestone Corporation, Tokyo; Ube Industries, Ltd., Yamaguchi-ken, both of Japan

[21] Appl. No.: 09/040,398

[22] Filed: Mar. 18, 1998

[30] Foreign Application Priority Data

Mar. 26, 1997 [JP] Japan ................................. 9-073528

[51] Int. Cl.[7] .............................. C08L 21/00; C08K 5/54; B60C 1/00
[52] U.S. Cl. ..................... 525/242; 525/232; 525/240; 523/351; 152/209 R
[58] Field of Search ...................... 525/242, 232, 525/240; 523/351; 152/209 R

[56] References Cited

U.S. PATENT DOCUMENTS 4,130,534  12/1978  Coran et al. ........................ 260/33.6
4,628,073  12/1986  Fisher ................................ 525/232
5,378,754   1/1995  Bauer et al. ........................ 524/514

FOREIGN PATENT DOCUMENTS 0039240  11/1981  European Pat. Off. .
2127217  12/1972  France .

*Primary Examiner*—James J. Seidleck
*Assistant Examiner*—Olga Asinovsky
*Attorney, Agent, or Firm*—Sughrue, Mion, Zinn, Macpeak & Seas, PLLC

[57] ABSTRACT

There are disclosed a resin-reinforced elastomer which comprises as principal components, a rubber and a polyolefin having an average particle diameter of at most 1 $\mu$m, and in which the rubber and the polyolefin are linked together; a process for producing the resin-reinforced elastomer by melt kneading a polyolefin, a No.1 rubber and a binding agent to prepare a thermoplastic composition, adding a No.2 rubber to the resultant thermoplastic composition and melt kneading the mixture thus formed to disperse the polyolefin in the rubber components; and a pneumatic tire using the resin-reinforced elastomer in its tread. The above resin-reinforced elastomer has a uniform modulus and a low density, is minimized in directionality, and is excellent in tensile strength, fatigue resistance and abrasion resistance.

12 Claims, No Drawings

RESIN-REINFORCED ELASTOMER, PROCESS FOR PRODUCING SAME AND PNEUMATIC TIRE USING SAME

BACKGROUND OF THE INVENTION

1. Field of the Invention

The present invention relates to a resin-reinforced elastomer, a process for producing the same and a pneumatic tire using the same. More particularly, the present invention pertains to a resin-reinforced elastomer which is excellent in modulus, strength, wear resistance, fatigue resistance and the like and which has a low density; to a process for efficiently producing said resin-reinforced elastomer; and to a pneumatic tire in which said resin-reinforced elastomer having the aforesaid characteristics is used in the tread.

2. Description of the Related Arts

A resin-reinforced elastomer, that is, the composition in which a small amount of a polyolefin is dispersed in a vulcanizable rubber such as natural rubber, polyisoprene rubber, polybutadiene rubber and ethylene-propylene rubber to improve the crack growth resistance, modulus and strength has heretofore been produced in general by a method in which a rubber is blended with a polyolefin such as polyethylene, polypropylene and ethylene-propylene copolymer and then the resultant blend is vulcanized.

For example, Japanese Patent Publication No. 78155/1995 (Hei-7) describes a thermoplastic elastomer composition which provides molded articles such as a car bumper that are minimized in dependence of tensile strength on thickness and in anisotropy and have favorable moldability as well as excellent external-appearance, while maintaining impact resistance.

In addition, Japanese Patent Provisional Publication No. 186606/1995(Hei-7) discloses a pneumatic tire which comprises a rubber composition containing a thermoplastic resin in its tread rubber and which is improved in rolling resistance, while maintaining favorable traction characteristics.

However, the resin-reinforced elastomer obtained by the aforesaid method involves the problems of its having directionality because of the oriented resin, deficiency in strength, wear resistance and fatigue resistance and the like, when being used in a tire member of an automobile. It is desirable that a tread rubber be excellent in strength, wear resistance, cut-through resistance and durability against heat generation, each being well-balanced with one another, and also be improved in extrusion processability. With regard to the above-mentioned requirements, the conventional resin-reinforced elastomer as mentioned above fails to sufficiently satisfy the required characteristics. Thus the present actual-situation is that the development of a resin-reinforced elastomer fully improved in the above-mentioned problems is eagerly desired.

A method in which low density polyethylene is blended to form a rubber composition is known as an effective means for enhancing various performances of a tire. Nevertheless, the blending of the low density polyethylene is unfavorable when used in a rubber composition for a tire which is raised in temperature during running, since it has a low melting point and thus remarkably changes the physical properties of the rubber composition while the temperature is elevated. On the other hand, the use of high density polyethylene in place thereof for the purpose of raising the melting point suffers the disadvantage that the Mooney viscosity of the unvulcani-zed rubber composition is raised, thereby causing extreme difficulty in extrusion processing, as described in U.S. Pat. No. 5,341,863.

SUMMARY OF THE INVENTION

Under such circumstances, the object of the present invention is to provide a resin-reinforced elastomer which is excellent in extrusion processability when being used in unvulcanized state, and which is characterized when made into a vulcanizate, by its uniform modulus, being minimized in directionality, being excellent in tensile strength, abrasion resistace and fatigue resistance and having a low density. Another object thereof is to provide a process for producing said resin-reinforced elastomer in high efficiency. Still another object thereof is to provide a pneumatic tire having excellent performances by the use of said resin-reinforced elastomer.

The present invention which has been developed for the above purposes provides a resin-reinforced elastomer which comprises a rubber and a polyolefin as principal components and which is characterized in that (1) the average particle diameter of the polyolefin is at most 1 $\mu$m, and (2) the rubber and the polyolefin are linked together. In this case, it is preferable that the resin-reinforced elastomer have a constitution wherein the rubber and the polyolefin are linked together via a binding agent (c).

In addition, the present invention provides a process for producing a resin-reinforced elastomer which comprises the steps of melt kneading a polyolefin (a), a first rubber (b) and a binding agent (c) to prepare a thermoplastic composition (A) having a constitution wherein the first rubber (b) is dispersed in the matrix of the polyolefin (a); and adding a second rubber (B) thereto, while melt kneading the resultant mixture to subject the matrix of said thermoplastic composition (A) to phase transition and disperse the polyolefin (a) in the rubber phase.

Moreover the present invention provides a pneumatic tire which comprises the resin-reinforced elastomer used in its tread, said resin-reinforced elastomer being prepared by blending said thermoplastic composition (A) and second rubber (B) so that the content of the polyolefin (a) falls within the range of 1 to 40 parts by weight based on 100 parts by weight of the total sum of the first rubber (b) and the second rubber (B). It is preferable that the average particle diameter of the polyolefin in the above-mentioned resin-reinforced elastomer be at most 1 $\mu$m and that the aforesaid polyolefin be at least one member selected from the group consisting of polyethylene, polypropylene and ethylene-propylene copolymer.

DESCRIPTION OF THE PREFERRED EMBODIMENTS

The resin-reinforced elastomer according to the present invention comprises a rubber and a polyolefin (a) as principal components. The polyolefin to be used as the component (a) having a high melting point or a high Vicat softening point causes inferior processability, when formed into an elastomer, whereas that having a low melting point or a low Vicat softening point gives rise to inferior strength and heat resistance, when formed into an elastomer. Preferably, the polyolefin as the component (a) has a melting point in the range of 80 to 250° C. from the viewpoint of the balance among processability, strength and heat resistance, also has a Vicat softening point of at least 50° C., especially in the range of 50 to 200° C., and further has a melt flow index (MFI) in the range of 0.2 to 100 g/10 min.

As such a polyolefin, use is preferably made of a homopolymer or a copolymer each of an olefin having 2 to 8 carbon atoms, a copolymer of an olefin having 2 to 8 carbon atoms and acrylic acid or an eater thereof, a copolymer of an olefin having 2 to 8 carbon atoms and an aromatic vinyl compound such as styrene, chlorostylene and α-methylstyrene, a copolymer of an olefin having 2 to 8 carbon atoms and vinyl acetate and a copolymer of an olefin having 2 to 8 carbon atoms and a vinylsilane compound.

The polyolefin as the component (a) can be selected for use from a variety of polyolefins without specific limitation, and is exemplified by polyethylene base, polypropylene base, a higher polyolefin(a polyolefin comprising a monomer having at least 4 carbon atoms) such as polybutene base, polypentene base and polyhexene base, and a copolymer of at least two different olefinic monomers. Specific examples of the polyethylene base include high density polyethylene (HDPE), low density polyethylene (LDPE) and linear low density polyethylene (LLDPE), halogenated polyethylene such as chlorinated polyethylene, brominated polyethylene and chlorosulfonated polyethylene and a copolymer of ethylene and a monomer other than olefin such as ethylene-vinyl acetate copolymer, ethylene-acrylic acid copolymer, ethylene-methyl acrylate copolymer, ethylene-styrene copolymer, ethylene-vinylsilane copolymer and ethylene-vinyltriethoxysilane copolymer. Specific examples of the polypropylene base include propylene homopolymer, a copolymer of propylene and a monomer other than olefin such as propylene-styrene copolymer and a copolymer of different olefins such as ethylene-propylene block copolymer and ethylene-propylene random copolymer. Examples of higher polyolefin include poly-4-methylpentene (P4MP1), polybutene-1 and polyhexene-1. Any of these polyolefins may be properly selected according to the purpose of use of the resin-reinforced elastomer. In particular, polyethylene base, polypropylene base and ethylene-propylene copolymer are preferable from the viewpoint of compatibility with rubber and industrializability. Any of these polyolefins may be used alone or in combination with at least one other.

On the other hand, the rubber component in the resin-reinforced elastomer comprises a first rubber as the component (b) and a second rubber as the component (B). Preferably, the first rubber to be used as the component (b) is vulcanizable and in the form of rubber at room temperature, and has a glass transition temperature of 0° C. or lower, particularly preferably −20° C. or lower. When the glass transition temperature thereof is higher than 0° C., there is a fear that the function as the rubber is less apt to be exhibited at low temperatures. The Mooney viscosity($ML_{1+4}$, 100° C.) of the first rubber is in the range of usually 20 to 150, preferably 30 to 80. The Mooney viscosity thereof less than 20 leads to deterioration of physical properties when made into vulcanized rubber as the case may be, whereas the Mooney viscosity thereof more than 150 sometimes results in worsened processability.

Examples of the first rubber as the component(b) include diene base rubber such as natural rubber (NR), isoprene rubber (IR), butadiene rubber (BR), 1,2-polybutadiene (1,2-BR), styrene-butadiene rubber(SBR),isoprene rubber in liquid form, butadiene rubber in liquid form, styrene-butadiene rubber in liquid form, nitrile rubber (NBR), chloroprene rubber (CR), nitrile-isoprene rubber, nitrile-chloroprene rubber, styrene-chloroprene rubber, styrene-isoprene rubber, vinylpyridine-butadiene rubber, butyl rubber (IIR), chlorinated butyl rubber, brominated butyl rubber, carboxylated styrene-butadiene rubber, carboxylated nitrile-butadiene rubber, styrene-butadiene block copolymer, styrene-isoprene block copolymer, carboxylated styrene-butadiene block copolymer and carboxylated styrene-isoprene block copolymer; polyolefin base rubber such as chlorinated polyethylene, chlorosulfonated polyethylene (CSM), ethylene-vinyl acetate copolymer, ethylene-propylene rubber (EPM), ethylene-propylene-diene copolymer (EPDM), ethylene-butene rubber and ethylene-butene-diene copolymer; rubber having the main chain of polymethylene type such as polychlorotrifluoro-ethylene, acrylic base rubber (ACM), ethylene-acrylic base rubber, fluorinated rubber and hydrogenated nitrile-butadiene rubber; rubber having oxygen atom in the main chain such as polyester-based thermoplastic rubber, epichlorohydrin rubber (CO), ethylene oxide-epichlorohydrin rubber (ECO) ethylene oxide-epichlorohydrin-allyl glycidyl ether copolymer and propylene oxide-allyl glycidyl ether copolymer; silicone rubber such as polyphenylsiloxane, polydimethylsiloxane, polymethylethylsiloxane and polymethylbutyl siloxane; ruber having nitrogen atom and oxygen atom in addition to carbon atom in the main chain such as polyamie-based thermoplastic rubber, nitroso rubber, polyester urethane and polyether urethane; and the like rubbers. Use can be made of derivatives of these rubbers such as epoxy-modified, silane-modified, or maleate-modified rubber. Any of these rubbers may be used alone or in combination with at least one other.

The second rubber to be used as the component (B) may be selected from the group same as the group from which said first rubber is selected for use. Any of the second rubbers may be used alone or in combination with at least one other.

It is preferable in the resin-reinforced elastomer according to the present invention, that the aforesaid rubber and polyolefin be bonded, especially via a binding agent (c). The binding agent as the component (c) may be selected for use from those that are usually employed as a binding agent for high polymers without specific limitation, and is exemplified by silane coupling agents, titanate coupling agents, novolak-based alkylphenol-formaldehyde initial condensate, resol-based alkylphenol-formaldehyde initial condensate, novolak-based phenol-formaldehyde initial condensate, resol-based phenol-formaldehyde initial condensate, unsaturated carboxylic acid, derivatives thereof and organic peroxides. Of these, silane coupling agents are preferable from the advantage that they are less apt to cause the component (a) or (b) to gel, and besides capable of firmly bonding to the interfaces of these components.

Specific examples of the silane coupling agent include vinyltrimethoxysilane, vinyltriethoxysilane, vinyltris(β-methoxyethoxy)silane, vinyltriacethoxysilane, γ-methacryloxypropyltrimethoxysilane, β-(3,4-epoxycyclohexyl)ethyltrimethoxysilane, γ-glycidoxypropylmethyldimethoxysilane, γ-glycidoxypropylethyldimethoxysilane, γ-glycidoxypropylethyldiethoxysilane, N-β-(aminoethyl)aminopropyltrimethoxysilane, N-β-(aminoethyl)aminopropyltriethoxysilane, N-β-(aminoethyl)aminopropylmethyldimethoxysilane, N-β-(aminoethyl)aminopropylethyldiethoxysilane, γ-aminopropyltriethoxysilane, N-phenyl-γ-aminopropylmethoxysilane, γ-[N-(β-methacryloxyethyl)-N, N-dimethylammonium(chloride)]-propylmethoxysilane and styryldiaminosilane. Of these is particularly preferable the silane coupling agent which has a group more apt to cause elimination by depriving alkoxy groups and the like of hydrogen atoms, a polar group, a vinyl group or the like. The silane coupling agent may be used alone or in combination with at least one other.

Examples of the binding agent other than the silane coupling agent include titanate-based coupling agent such as isopropylisostearoyl titanate, isopropyl(N-aminoethyl) titanate, tetra(2,2-diallyloxymethyl-1-butyl)bis(ditridecyl) phosphite titanate, bis(dioctylpyrophosphate)oxyacetate titanate, isopropyltrioctanoyl titanate, isopropylisostearoyl-diacryl titanate and isopropyldimethacroyldiacryl titanate.

In the case where the silane coupling agent is used as the component (c), it may be used in combination with an organic peroxide. It is thought that by the combinational use of the silane coupling agent and the organic peroxide, a radical is formed on the molecular chain of the polyolefin as the component (a) and is reacted with the silane coupling agent, whereby the reaction between the component (a) and the silane coupling agent is accelerated. The amount of the organic peroxide to be used is in the range of preferably 0.01 to 1.0 parts by weight based on 100 parts by weight of the component (a). When natural rubber or polyisoprene (rubber having isoprene structure) is used as the component (b), the organic peroxide need not be used, since the aforesaid reaction takes place by shearing at the time of kneading.

The organic peroxide is preferably used which has a half-life temperature for one minute in the range of a melt kneading temperature to a temperature higher than the same by 30° C., approx. That is to say, the organic peroxide is preferably used which has a half-life temperature for one minute is in the range of 110 to 200° C., approx.

There are available a variety of organic peroxides, which are specifically exemplified preferably by peroxyketal acid such as 1,1-di(t-butylperoxy)-3,3,5-trimethylcyclohexane; 1,1-di(t-butyl-peroxy)cyclohexane; 2,2-di(t-butylperoxy) butane; 4.4-di(t-butylperoxy)valerianic acid n-butyl ester; and 2,2-bis(4.4-di-t-butylperoxycyclohexane)propane; and alkyl perester such as 2,2,4-trimethylpentyl peroxyneode-canoate; α-cumyl peroxyneodecanoate; t-butyl peroxyneo-hexanoate; t-butyl peroxyneopivalate; t-butyl peroxyacetate; t-butyl peroxylaurate; t-butyl peroxybenzoate; t-butyl per-oxyphthalate; and t-butyl peroxyisophthalate. The amount of the organic peroxide to be used may be properly selected according to the situation, and is in the range of preferably 0.01 to 1.0 part by weight based on 100 parts by weight of the component (a).

The foregoing resin-reinforced elastomer has the structure in which the rubber component comprising the first rubber (b) and the second rubber (B) forms matrix, and the component (a) is dispersed therein in the form of island, and the aforesaid components(a) and (b) are bonded to each other on the interface, especially via a binding agent(c), thereby enabling the reinforcing filler to fully manifest the working effect thereof. The component(a) in the resin-reinforced elastomer is uniformly dispersed as fine particles having an average particle diameter of at most 1 μm, preferably 0.01 to 1 μm.

With regard to the content of each of the components in the resin-reinforced elastomer, the content of the component (b) is preferably 20 to 250, more preferably 50 to 200 parts by weight per 100 parts by weight of the component (a). The content of the component (b), when more than 250 parts by weight per 100 parts by weight of the component (a), makes it difficult for the component (a) to form matrix in the thermoplastic composition as described hereinafter, thus causing difficulty in pelletizing and worse workability; whereas the content thereof, when less than 20 parts by weight per 100 parts by weight of the component (a), brings about the tendency that sufficient phase transition is made impossible to carry out at the time of melt kneading with the component (B), thereby worsening the dispersion of the component(a).

The content of the component(c), though not being particularly limited, is preferably 0.1 to 2.0, more preferably 0.2 to 1 part by weight per 100 parts by weight of the component (a). The content of the component (c), when less than 0.1 part by weight per 100 parts by weight of the component (a), makes it difficult to obtain a thermoplastic composition having high strength [the structure in which the componenet (b) is dispersed in the matrix of the component(a) as described hereinafter]; whereas the content thereof, when more than 2.0 parts by weight per 100 parts by weight of the component (a), brings about difficulty in obtaining a thermoplastic composition having excellent modulus. In the case where the content of the component (c) is within the above-mentioned range, strong bonding is formed between the components (a) and (b). As a result, a thermoplastic composition is obtained which has an MFI in the range of 0.01 to 50 g/10 min. (190° C., 5.0 kg) and a density of 0.900 to 1.200 g/cm³. An MFI of more than 50 g/10 min is unfavorable because of decreased mechanical strength; whereas an MFI of less than 0.01 g/10 min is also unfavorable because of lowered fluidity and difficulty in handling. In addition, a density exceeding 1.200 g/cm³ is unfavorable, since the effect towards lightweightness is decreased by a decrease in difference in density between ordinary rubber-reinforcing agents such as carbon black, inorganic fillers, etc. and the thermoplastic composition.

Preferably, the content of the component (a) is in the range of 1 to 40 parts by weight per 100 parts by weight of the vulcanizable rubber component [total of the first rubber as the component(b) and the second rubber as the component(B)]. The content of the component (a) of less than 1 part by weight lowers the modulus, strength, wear resistance, fatigue resistance and the like of the vulcanizate, and causes the tendency to decrease the effect towards lightweightness; whereas the content thereof of more than 40 parts by weight causes the tendency to decrease the rubber elasticity. The content of the component (a) is preferably 2 to 30 parts, more preferably 3 to 20 parts by weight.

The process for producing the resin-reinforced elastomer of the present invention is not specifically limited, provided that said process is capable of producing the resin-reinforced elastomer having the foregoing properties. According to the process of the present invention as described hereunder, the desirable resin-reinforced elastomer can efficiently be produced.

In the process of the present invention, the thermoplastic composition (A) is firstly prepared by melt kneading 100 parts by weight of the polyolefin as the component (a), the first rubber as the component (b) in an amount of preferably 20 to 250, more preferably 50 to 200 parts by weight, and the binding agent as the component(c) in an amount of preferably 0.1 to 2.0, more preferably 0.2 to 1.0 part by weight. The resultant thermoplastic composition (A), which has an MFI of 0.01 to 50 g/10 min. (190° C., 5.0 kg), approx. and a density of 0.900 to 1.200 g/cm³, is of the structure in which the component (b) is dispersed in the matrix of the component(a).

The form or shape of the thermoplastic composition (A) is not specifically limited, but is preferably in the form of pellet. The reason is that a pellet product facilitates the transfer and handling of itself as well as uniform kneading with the component (B) as described hereinafter, enables carbon black and the like to be uniformly and readily blended, kneaded and dispersed, and makes it possible to easily obtain the resin-reinfored elastomer wherein fine particles of the olefin are uniformly dispersed therein.

Subsequently, the objective resin-reinforced elastomer is produced by adding the second rubber as the component(B)

to the thermoplastic composition (A) thus obtained so that the component(a) amounts preferably to 1 to 40 parts by weight, more preferably to 2 to 30 parts by weight based on 100 parts by weight of the total of the components (b) and (B), and melt kneading the resultant mixture to subject the matrix of the thermoplastic composition (A) to phase transition and to uniformly disperse the component (a) into the rubber phase.

In this case, by melt keading the mixture at a temperature higher than the melting point of the component (a) in the thermoplastic composition (A), preferably by at least 5° C., more preferably by at least 10° C., the component(a) which has formed the matrix in the thermoplastic composition (A) is subjected to phase transition with the result that the component(a) is subjected to microdispersion in the matrix consisting of the No.1 rubber and the No.2 rubber. A temperature lower than the melting point of the component (a) leads to difficulty in the occurrence of the phase transition and in sufficient dispersion.

The resin-reinforced elastomer is prepared, for example by the following steps:

Step (1): melt kneading the components(a) and (c) for 3 to 5 minutes at a temperature higher than the melting point of the component(a), preferably by at least 10° C. to cause reaction.

Step (2): melt kneading the reaction product in the step (1) and the components(b) for 3 to 5 minutes at a temperature higher than the melting point of the component(a), preferably by at least 10° C.

Step (3): extruding the melt kneaded product in the step (2) at a temperature higher than the melting point of the component(a), and pelletizing the extruded product at a temperature lower than the melting point of the component(a).

Step (4): melt kneading the pelletized thermoplastic comosition (A) obtained in the step (3) and the components(B) at a temperature higher than the melting point of the component(a) preferably by at least 10° C.

In addition, the Steps (1) and (2) may be carried out simultaneously or in reverse order. That is to say, the components (a) and (b) may be melt blended in Step (1), and then the mixture may be reacted with the component (c) in Step(2). Alternatively, the components(a),(b) and (c) may be melt blended simultaneously to proceed with the reaction.

The foregoing melt blending can be carried out by means of machinery or equipment which is usually used for kneading a resin or rubber. Examples thereof include Banbury mixers, kneaders, kneading extruders, open rolls, single-screw kneaders and twin-screw kneaders.

The resin-reinforced elastomer may further be blended with an ordinary short fiber, which is exemplified by nylon short fiber, polyester short fiber, aramid short fiber, cotton short fiber, vinylon short fiber, rayon short fiber, natural cellulose short fiber and acrylic short fiber.

In the kneading step for the component(B), a chemical agent may be added and kneaded as necessary, which is usually employed in the rubber industry and is exemplified by vulcanizing agents, vulcanizing aids, fillers, age resistors, process oils, zinc oxide and stearic acid.

The amount of a vulcanizing agent to be added therein is not specifically limited, but is in the range of preferably 0.1 to 5.0, particularly preferably 0.5 to 3.0 parts by weight based on 100 parts by weight of the rubber components. The amount of a vulcanizing aid, when being added, is in the range of preferably 0.01 to 2.0, particularly preferably 0.1 to 1.0 parts by weight based on 100 parts by weight of the rubber components.

Examples of the vulcanizing agents include well-known vulcanizing agents such as sulfur, organic peroxides, resin vulcanizing agents and metal oxides such as magnesium oxide.

The vulcanizing aid is selected from well-known vulcanizing aids such as aldehydes, ammonia, amines, guanidine, thiourea, thiazole, thiurams, dithiocarbamate and xanthate.

Examples of the fillers include reinforcing agent such as carbon black of various types, white carbon, activated calcium carbonate, ultrafine particulate magnesium silicate, high impact polystyrene, phenolic resins, lignins, modified melamine resin, cumarone indene resins and petroleum resins, calcium carbonate, basic magnesium carbonate, clay, litharge, diatomaceous earth, regenerated rubber and powdery rubber.

Examples of the age resistor include amine-ketones, imidazoles, amines, phenols, sulfur base and phosphorus base.

The usable process oil may be any of aromatic base, naphthenic base and paraffinic base.

The vulcanization temperature of the resin-reinforced elastomer may be the vulcanization temperature of ordinary rubber and is preferably in the range of 100 to 190° C.

The foregoing resin-reinforced elastomer is widely and effectively used for the external members of tires such as tire tread and tire side-wall, internal members of tires such as carcass, bead and chafer, and rubber members for industrial products such as hoses, belts, rubber rolls and rubber crawlers.

In the following, some description will be given of the pneumatic tire using the resin-reinforced elastomer of the present invention.

In the tread of the pneumatic tire according to the present invention, use is made of the foregoing resin-reinforced elastomer which is produced by blending the aforesaid thermoplastic composition(A) and the second rubber as the component(B) and melt kneading the resultant mixture, said thermoplastic composition(A) having the structure in which the component(b) is dispersed in the matrix of the component(a) which matrix is formed by melt kneading the first rubber as the component(b) in an amount of preferably 20 to 250, more preferably 50 to 200 parts by weight, and the binding agent as the component(c) in an amount of preferably 0.1 to 2.0, more preferably 0.2 to 1.0 part by weight each based on 100 parts by weight of the polyolefin (a). The form of the thermoplastic composition (A) is particularly preferably pellet from the aspect of workability.

The foregoing resin-reinforced elastomer is capable of manifesting the effect as the reinforcing filler through the constitution in which the rubber component consisting of the first rubber as the component(b) and the second rubber as the component(B) forms the matrix; the polyolefin (a) in the form of island is dispersed in the rubber component in an amount of 1 to 40, preferably 2 to 30 parts by weight based on 100 parts by weight of the rubber component; and the components (a) and (b) are bonded to each other on the interface thereof via the binding agent. The polyolefin as the component(a) in the resin-reinforced elastomer is uniformly dispersed as fine particles having an average particle diameter of preferably at most 1 μm, more preferably 0.01 to 1 μm.

The polyolefin as the component (a) may be properly selected for use from those described hereinbefore, and is particularly preferably polyethylene, polypropylene or ethylene-propylene copolymer. Any of these polyolefins may be used alone or in combination with at least one other.

The types of the first and second rubbers are as variously exemplified before and are preferably natural rubber (NR), isoprene rubber (IR), butadiene rubber (BR), 1,2-polybutadiene (1,2-BR) or styrene butadiene rubber (SBR). Preferably, natural rubber or isoprene rubber occupies at least 40% by weight of the total amount of the rubber components [first rubber (b) plus second rubber (B)].

Moreover, the resin-reinforced elastomer may be blended with carbon black as a filler in an amount of usually 30 to 70 parts by weight based on 100 parts by weight of the total amount of the rubber components.

In the following, the present invention will be described in more detail with reference to comparative examples and working examples, which however shall not limit the present invention thereto.

Various measurements were performed as follows:
(1) Evaluation method for the thermoplastic composition (A)
① Possibility of pelletization
Pelletizable composition was marked with ○, and non-pelletizable composition was marked with x.
② Melt Flow Index (MFI)
The amount of molten resin passed through an orifice having an inside diameter of 2 mm and a length of 8 mm at a load of 5000 g at 190° C. was expressed in g/10 min. as MFI.
③ Density
Measurements were made of density according to JIS K7112 by means of a density gradient tube.
(2) Evaluation method for the resin-reinforced elastomer
① Tensile stress, tensile strength and elongation at break
According to JIS K6251, measurements were made of the tensile stress, tensile strength and elongation at break of a vulcanizate at 100% and 300% in both parallel and perpendicular directions against sheet discharge direction by punching sheet into test specimen according to JIS dumbbell Shape Pattern No.3.
② Hardness
Measurements were made of hardness according to JIS K6251 by type A.
③ Abrasion resistance
Evaluations were made of abrasion resistance according to JIS K6264 by measuring Lambourn abrasion using indexes based on an index in Comparative Example 1 as 100.
④ Fatigue resistance
Evaluations were made of fatigue resistance using a constant-elongation-type fatigue testing machine (produced by Yasuda Seiki Seisakusho) by applying a load of 500 g and a constant strain of 100% repeatedly to determine the number of times until the test specimen was cut off.
⑤ Particle diameter
Measurements were made of the particle diameters of the polyolefin dispersed in the rubber matrix to determine the average particle diameter by the use of electrophotographs of the vulcanized resin-reinforced elastomer.
(3) Evaluation method for the performance of test tire.
① Cut-through resistance and chipping resistance.
Each of tires was mounted on a 10 ton truck and was subjected to running test mainly on rough and unpaved roads at an internal pressure of 0.71 MPa until the worn out condition (maximum depth of residual groove being at most 3 mm).
※ Cut-through resistance was determined by peeling the tire tread and measuring the number of cuts which reached the belt through the tread.
※ Chipping resistance was determined by measuring the number of chips being at least 1 cm² in size within the surface of tire tread in contact with ground.

② Durability against heat generation
According to the durability test procedure prescribed in JIS D4230-1986 Table 5.5, the durability against heat generation was evaluated by measuring the running range which causes tire breakage to the extent of being incapable of running, using indexes based on an index in Comparative Example T-2 as 100. The durability against heat generation excels with an increase in said index.
③ Abrasion resistance
Each of tires was mounted on a truck and was subjected to continuous running test for a distance of 20,000 km, when an evaluation was made of the abrasion resistance thereof by measuring the tread groove depth, using indexes based on an index in Comparative Example T-2 as 100. The abrasion resistance excels with an increase in said index.
④ Processability
Measurements were made of the viscosity of unvulcanized rubber kneaded for use in the aforesaid tire tread under the conditions of 100° C. and a shear rate of 10 sec$^{-1}$ by the use of a processability testing machine (produced by Monsanto Co., Ltd. under the trade name "MPT") to evaluate processability, using indexes based on an index in Comparative Example T-2 as 100. The processability excels with an increase in said index.

<Preparation of thermoplastic composition (A)>.

PREPARATION EXAMPLE 1

Preparation of Sample 1

There were used a high density polyethylene (HDPE produced by Maruzen Polymer Co., Ltd. under the trade name "Chemilets HD 3070": density of 0.952 g /cm³, MFI of 8.0 g/10 min, melting point of 130° C.) as the component (a), NR (SNR-L) as the component (b) and γ-methacryloxypropyltrimethoxysilane as the component (c) At first, 100 parts by weight of the component(a) and 1.0 part by weight of the component(c) were melt kneaded at 140° C. for 3 minutes with a B-type Banbury mixer with 1.7 l capacity, and then the melt kneaded product and 130 parts by weight of the component(b), each based on 100 parts by weight of the component(a), were melt kneaded at 150° C. for 3 minutes with a B-type Banbury mixer with 1.7 l capacity in the same manner as before. The kneaded product was dumped at 170° C. and was pelletized at a die temperature of 160° C. The objective product had a density of 0.934 g /cm³, MFI of 2.0 g/10 min, and a chemical composition and physical properties as given in Table 1.

PREPARATION EXAMPLE 2

Preparation of Sample 2

The procedure in Preparation Example 1 was repeated to prepare Sample 2 and pelletize the same except that the melt kneading was carried out by the use of the component(a) consisting of polypropylene(PP, produced by Ube Industries Ltd. under the trade name "Ube Polypro J309G", density of 0.905 g/cm³, MFI of 9.0 g/10 min, melting point of 148° C.) at 150° C. for 3 minutes. The objective product had a density of 0.913 g/cm³, MFI of 1.90 g/10 min, and a chemical composition and physical properties as given in Table 1.

PREPARATION EXAMPLE 3

Preparation of Sample 3

The procedure in Preparation Example 2 was repeated to prepare Sample 3 and pelletize the same except that the use of the component(c) was omitted. The resultant product had a density of 0.912 g/cm³, MFI of 2.5 g/10 min, and a chemical composition and physical properties as given in Table 1.

PREPARATION EXAMPLE 4

Preparation of Sample 4

The procedure in Preparation Example 2 was repeated to prepare Sample 4 except that the melt kneading was carried out by the use of the component (a) consisting of ultrahigh molecular polyethylene(HMPE, produced by Mitsui Petrochemical Industries, Ltd. under the trade name "Hizex Million 340M", density of 0.930 g/cm$^3$, melting point of 136° C.). However, pelletizing was impossible. The chemical composition and physical properties of the non-palletized product are given in Table 1.

PREPARATION EXAMPLE 5

Preparation of Sample 5

The procedure in Preparation Example 2 was repeated to prepare Sample 5 except that the melt kneading was carried out by the use of 500 parts by weight of NR as the component (b). However, pelletizing was impossible. The chemical composition and physical properties of the non-palletized product are given in Table 1.

TABLE 1

| Sample No. | 1 | 2 | 3 | 4 | 5 |
|---|---|---|---|---|---|
| Thermoplastic composition (A) | | | | | |
| Component (a) (wt.parts) | HDPE (100) | PP (100) | PP (100) | HMPE (100) | PP (100) |
| Component (b) (wt.parts) | NR (130) | NR (130) | NR (130) | NR (130) | NR (500) |
| Component (c) (wt.parts) | MPMS (1) | MPMS (1) | — | MPMS (1) | MPMS (1) |
| Pelletizing | | | | | |
| Possible ○ | ○ | ○ | ○ | ○ | |
| Impossible x | | | | x | x |
| MFI (g/10 min.) | 2.0 | 1.9 | 2.5 | <0.01 | <0.01 |
| Density (g/cm$^8$) | 0.934 | 0.913 | 0.912 | — | — |

[Remarks] MPMS: γ-methacryloxypropyltrimethoxysilane

<Preparation of Resin-reinforced Elastomer>

EXAMPLES 1 TO 4

In a 250 ml plastomill for laboratory use which had been set to 120° C. and 68 r.p.m. were placed a sample of the thermoplastic composition (A) and NR as the component (B) in the blending formulation as shown in Table 2, followed by mastication for 30 seconds. Then the resultant mixture was further blended with carbon black (produced by Mitsubishi Chemical Industries Ltd. under the trade name ISAF, average particle diameter of 21 μm, DBP oil adsorption of 117 ml/100 g), zinc oxide, stearic acid and an age resistor(N-phenyl-N'-isopropyl-phenylenediamine, trade name "810NA") followed by kneading for 3 minutes. The the dumped product, the temperature of which was 160 to 170° C., was blended with a vulcanization accelerator DM (dibenzothiazil sulfide), a vulcanization accelerator D (diphenylguanidine) and sulfur on an open roll which had been set to 80° C. The blend thus obtained was placed in a mold and vulcanized at 145° C. for 25 minutes to produce a resin-reinforced elastomer. Evaluations were made of the physical properties of the resultant resin-reinforced elastomer. The results are given in Table 2.

COMPARATIVE EXAMPLE 1

The procedure in Example 1 was repeated to prepare a resin-reinforced elastomer except that polypropylene resin was used in place of the thermoplastic composition (A) in accordance with the formulation as shown in Table 2. Evaluations were made of the physical properties of the resultant resin-reinforced elastomer. The results are given in Table 2. This elastomer was inferior to that in the examples in terms of abrasion resistance as well as fatigue resistance.

COMPARATIVE EXAMPLE 2

The procedure in Example 1 was repeated to prepare a resin-reinforced elastomer except that the amounts of the thermoplastic composition (A) {Sample 2} and NR as the component(B) were altered in accordance with the formulation as shown in Table 2. Evaluations were made of the physical properties of the resultant resin-reinforced elastomer. The results are given in Table 2. In spite of its very high modulus as compared with the examples, this elastomer had a low tensile strength and elongation and was inferior to the elastomers in examples in terms of abrasion resistance and fatigue resistance, without forming complete sea-island constitution.

COMPARATIVE EXAMPLES 3 TO 5

The procedure in Example 1 was repeated to prepare resin-reinforced elastomers except that the amounts of the thermoplastic composition (A) {Samples 3 to 5} and NR as the component(B) were altered in accordance with the formulation as shown in Table 2. Evaluations were made of the physical properties of the resultant resin-reinforced elastomers. The results are given in Table 2. These elastomers were inferior to those in the examples in terms of abrasion resistance as well as fatigue resistance.

TABLE 2

| | Example No. | | | | Comparative Example No. | | | | |
|---|---|---|---|---|---|---|---|---|---|
| | 1 | 2 | 3 | 4 | 1 | 2 | 3 | 4 | 5 |
| Thermoplastic Composition (A | | | | | | | | | |
| Sample No. | 1 | 2 | 2 | 2 | — | 2 | 3 | 4 | 5 |
| (part/s by weight) | 46 | 23 | 46 | 69 | — | 115 | 23 | 23 | 60 |
| PP resin (part/s by weight) | — | — | — | — | 10 | — | — | — | — |
| Component (B) NR (part/s by weight) | 74 | 87 | 74 | 61 | 100 | 35 | 74 | 74 | 50 |
| Polyolefin amount per 100 parts by weight of rubber component (part/s by weight) | 20 | 10 | 20 | 30 | 10 | 50 | 10 | 10 | 10 |

TABLE 2-continued

|  |  | Example No. |  |  |  | Comparative Example No. |  |  |  |  |
| --- | --- | --- | --- | --- | --- | --- | --- | --- | --- | --- |
|  |  | 1 | 2 | 3 | 4 | 1 | 2 | 3 | 4 | 5 |
| Physical Properties |  |  |  |  |  |  |  |  |  |  |
| 100% tensile stress (MPa) | ∥ | 3.7 | 3.5 | 4.9 | 6.1 | 3.9 | 18.6 | 3.7 | 3.7 | 3.4 |
|  | ⊥ | 3.6 | 3.3 | 4.5 | 5.7 | 3.3 | 15.4 | 3.3 | 3.4 | 2.9 |
| 300% tensile stress (MPa) | ∥ | 11.8 | 13.6 | 16.4 | 20.2 | 14.5 | — | 13.8 | 14.8 | 13.4 |
|  | ⊥ | 11.6 | 13.3 | 15.5 | 19.1 | 13.6 | — | 13.3 | 13.7 | 12.9 |
| Tesile strength (MPa) | ∥ | 30.1 | 28.3 | 28.8 | 28.2 | 27.8 | 23.1 | 27.9 | 25.8 | 27.2 |
|  | ⊥ | 29.6 | 28.4 | 28.6 | 28.1 | 27.5 | 22.5 | 27.5 | 25.5 | 26.8 |
| Elongation (%) | ∥ | 640 | 550 | 500 | 450 | 540 | 150 | 550 | 480 | 490 |
|  | ⊥ | 640 | 560 | 510 | 460 | 540 | 170 | 550 | 500 | 490 |
| Hardness (JIS-A) |  | 73 | 72 | 78 | 82 | 73 | 95 | 72 | 71 | 71 |
| Abrasion resistance (index) |  | 111 | 113 | 105 | 102 | 100 | 87 | 103 | 85 | 102 |
| Fatigue resistance: numbers |  | 85,000 | 96,000 | 23,000 | 15,000 | 20,000 | <1,000 | 52,000 | <1,000 | 35,000 |
| Particle diameter (μm) |  | 0.38 | 0.32 | 0.51 | 0.72 | 1.21 | — | 0.64 | 30.10 | 1.12 |

[Remarks]
∥: parallel
⊥: perpendicular
Other components (part/s by weight): carbon black (40), zinc oxide (3), stearic acid (2), age resistor-810NA (1), vulcanization accelerator DM (0.6), vulcanization accelerator D (0.2), sulfur (1.5).

<Preparation of test tires and evaluation of performance>

In accordance with the blending formulation as shown in Table 3, tires of the size 10.00R20 14PR were prepared by a conventional method by using, in the tire tread, a resin-reinforced elastomer which had been prepared from the compounding ingredients including the thermoplastic elastomer (A), component (B), carbon black (HAF), aroma oil and the like. Thus the performances of the resultant tires were examined.

COMPARATIVE EXAMPLES T-1 TO -T-4

Test tires were prepared by using, in the tire treads, rubber compositions wherein the blending amounts of carbon black (HAF) which is the typical means for modifying the characteristics of tire tread were varied from 40 to 55 parts by weight. Thus the performances of the resultant tires were examined. The results are given in Table 3.

COMPARATIVE EXAMPLE T-5

Test tires were prepared in the same manner as in Comparative Example T-4 except that the thermoplastic composition (Sample 1) was blended so that the amount of the polyolefin was made to 0.5 part by weight based on 100 parts by weight of the whole rubber components. The results are given in Table 3. As can be seen from the table, no improvement effect is recognized against Comparative Example T-4 in which the amount of carbon black was same as herein, but no polyolefin was used.

EXAMPLES T-1 TO -T-5

Test tires were prepared in the same manner as in Comparative Example T-4 except that the thermoplastic composition (Sample 1) was blended so that the amount of the polyolefin was made to 1.5 to 10 parts by weight based on 100 parts by weight of the whole rubber components. The results are given in Table 3. As can be seen from the table, these test tires are remarkably excellent in both durability against heat generation and abrasion resistance and also in extrusion processability as compared with Comparative Example T-1 to T-4.

EXAMPLES T-6 TO -T-7

Test tires were prepared in the same manner as in Comparative Example T-4 except that the thermoplastic composition (Sample 1) was blended so that the amount of the polyolefin was made to 15 to 18 parts by weight based on 100 parts by weight of the whole rubber components. The results are given in Table 3. As can be seen from the table, these test tires are excellent in all respects including durability against heat generation, abrasion resistance and cut-through resistance as compared with Comparative Example T-1 in which the extrusion processability is almost the same as these examples.

EXAMPLES T-8

Test tires were prepared in the same manner as in Example T-3 except that an increased amount of carbon black was added to the rubber components. Various performances of the resultant tires are given in Table 3. As can be seen from the table, these test tires are excellent in all respects including cut-through resistance, durability against heat generation and abrasion resistance as compared with Comparative Example T-1.

EXAMPLES T-9

Test tires were prepared in the same manner as in Example T-3 except that use was made of the thermoplastic composition (Sample 2) incorporated with polypropylene as the polyolefin. Various performances of the resultant tires are given in Table 3. As can be seen from the table, these test tires are excellent in extrusion processability, durability against heat generation and abrasion resistance in a well balanced manner as compared with Comparative Examples T-1 to T-4; and are also excellent in extrusion processability and abrasion resistance as compared with Comparative Examples T-7 as described hereinafter in which only polypropylene was added to the rubber components at the time of blending without the use of the thermoplastic composition as the component (A).

COMPARATIVE EXAMPLES T-6 TO T-7

Test tires were prepared in the same manner as in Example T-3 except that only polyolefin was added to the rubber composition without the use of the thermoplasic composition as the component (A). The results are given in Table 3. As can be seen from the table, the test tires in Comparative Example T-6 are inferior to those in Example T-3 wherein the thermoplastic composition (Sample 1) was used as the component (A) in regard to extrusion processability, durability against heat generation and abrasion resistance, especially in regard to extrusion processability.

EXAMPLE T-10 & COMPARATIVE EXAMPLE T-8

Test tires were prepared in the same manner as in Example T-3 and Comparative Example T-4, respectively except that use was made, as the component (B), of the blend of NR and BR (produced by Japan Synthetic Rubber Co., Ltd. under the trade name "BR01"). The results are given in Table 3. As can be seen from the table, the test tires in Example T-10 are remarkably improved as compared with Comparative Example T-8 in terms of chipping resistance, cut-through resistance and abrasion resistance in spite of durability against heat generation being almost the same therebetween.

EXAMPLE T-11 & COMPARATIVE EXAMPLES T-9 to T-10

Test tires were prepared in the same manner as in Example T-10 and Comparative Example T-8, respectively in Example T-11 & Comparative Examples T-9, except that increased amounts of carbon black and aroma oil were blended in studless tires. In Comparative Example T-10, test tires were prepared in the same manner as in Comparative Example T-6 except that use was made of increased amounts of carbon black and aroma oil along with the blend of NR and BR as the component (B). The results are given in table 3.

From the results of Examples T-10 & T-11 and Comparative Examples T-9 & T-10, it is understood that the tires prepared by the use of the thermoplastic composition of the present invention are superior to those prepared without the use of said thermoplastic composition and to those prepared by adding a polyolefin at the time of blending with regard to cut-through resistane, abrasion resistance and the like in the case where an alteration is made of the type of the rubber to be used as the component (B), or an alteration is made of the amount of oil. It can also been seen therefrom that the tires in Example T-11 are superior to those in Comparative Example T-9 with respect to chipping resistance, cut-through resistane and abrasion resistance in spite of durability against heat generation being almost the same therebetween; and also that the tires in Example T-11 are markedly improved in extrusion processability as compared with Comparative Example T-10 in spite of the performances of tires being almost the same therebetween.

TABLE 3

|  | Comparative Example | | | | | Example | | | | | |
| --- | --- | --- | --- | --- | --- | --- | --- | --- | --- | --- | --- |
|  | T-1 | T-2 | T-3 | T-4 | T-5 | T-1 | T-2 | T-3 | T-4 | T-5 | T-6 |
| Thermoplastic composition (A) | | | | | | | | | | | |
| Sample 1 (ppwt) | — | — | — | — | 1.15 | 3.45 | 9.20 | 11.5 | 18.4 | 23.0 | 34.5 |
| Sample 2 (ppwt) | — | — | — | — | — | — | — | — | — | — | — |
| HDPE resin (ppwt) | — | — | — | — | — | — | — | — | — | — | — |
| PP resin (ppwt) | — | — | — | — | — | — | — | — | — | — | — |
| Component (B)    NR (ppwt) | 100 | 100 | 100 | 100 | 99.35 | 98.05 | 94.8 | 93.5 | 89.6 | 87.0 | 76.6 |
|                  BR (ppwt) | — | — | — | — | — | — | — | — | — | — | — |
| Amount of polyolefin per 100 ppwt of rubber component (ppwt) | 0 | 0 | 0 | 0 | 0.5 | 1.5 | 4 | 5 | 8 | 10 | 15 |
| Carbon black (ppwt) | 55 | 50 | 45 | 40 | 40 | 40 | 40 | 40 | 40 | 40 | 40 |
| Aroma oil (ppwt) | 1 | 1 | 1 | 1 | 1 | 1 | 1 | 1 | 1 | 1 | 1 |
| Polyolefin particle dia. ($\mu$m) | — | — | — | — | 0.3 | 0.3 | 0.3 | 0.3 | 0.35 | 0.4 | 0.42 |
| Performances | | | | | | | | | | | |
| Extrusion processsability (index) | 94 | 100 | 108 | 122 | 121 | 120 | 118 | 116 | 112 | 105 | 97 |
| Chipping resistance (Nos.) | 1 | 0 | 1 | 2 | 2 | 1 | 1 | 0 | 0 | 0 | 0 |
| Cut-through resistance (Nos.) | 6 | 8 | 16 | 25 | 25 | 20 | 10 | 5 | 3 | 2 | 2 |
| Durability against heat generation (index) | 94 | 100 | 108 | 115 | 118 | 117 | 115 | 114 | 109 | 106 | 99 |
| Abrasion resistance (index) | 103 | 100 | 94 | 90 | 90 | 94 | 104 | 108 | 112 | 114 | 114 |

|  | Example | | | Comparative Example | | Example | Comp. Example | Example | Comparative Example | |
| --- | --- | --- | --- | --- | --- | --- | --- | --- | --- | --- |
|  | T-7 | T-8 | T-9 | T-6 | T-7 | T-10 | T-8 | T-11 | T-9 | T-10 |
| Thermoplastic composition (A) | | | | | | | | | | |
| Sample 1 (ppwt) | 41.4 | 11.5 | — | — | — | 11.5 | — | 11.5 | — | — |
| Sample 2 (ppwt) | — | — | 11.5 | — | — | — | — | — | — | — |
| HDPE resin (ppwt) | — | — | — | 5 | — | — | — | — | — | 5 |
| PP resin (ppwt) | — | — | — | — | 5 | — | — | — | — | — |
| Component (B)    NR (ppwt) | 76.6 | 93.5 | 93.5 | 100 | 100 | 63.5 | 70 | 63.5 | 70 | 70 |
|                  BR (ppwt) | — | — | — | — | — | 30 | 30 | 30 | 30 | 30 |
| Amount of polyolefin per 100 ppwt of rubber component (ppwt) | 18 | 5 | 5 | 5 | 5 | 5 | 0 | 5 | 0 | 5 |
| Carbon black (ppwt) | 40 | 50 | 40 | 40 | 40 | 40 | 40 | 50 | 50 | 50 |
| Aroma oil (ppwt) | 1 | 1 | 1 | 1 | 1 | 1 | 1 | 5 | 5 | 5 |
| Polyolefin particle dia. ($\mu$m) | 0.45 | 0.25 | 0.5 | 0.35 | 20 | 0.3 | — | 0.3 | — | 0.35 |

TABLE 3-continued

| Performances | | | | | | | | | | |
|---|---|---|---|---|---|---|---|---|---|---|
| Extrusion processability (index) | 94 | 95 | 114 | 108 | 95 | 101 | 106 | 118 | 128 | 109 |
| Chipping resistance (Nos.) | 1 | 0 | 1 | 1 | 1 | 2 | 7 | 3 | 9 | 4 |
| Cut-through resistance (Nos.) | 3 | 3 | 8 | 8 | 6 | 10 | 28 | 24 | 33 | 24 |
| Durability against heat generation (index) | 95 | 100 | 116 | 110 | 116 | 116 | 119 | 100 | 102 | 101 |
| Abrasion resistance (index) | 113 | 116 | 100 | 104 | 95 | 107 | 97 | 98 | 80 | 97 |

[Remarks] ppwt: part/s by weight . . . Other components (ppwt): zinc oxide (4), stearic acid (2), paraffin wax (2), age resistor Santoflex 13 (1), vulcanization accelerator CZ (1), sulfur (2).

What is claimed is:

1. A resin-reinforced elastomer which comprises a rubber and a polyolefin (a) as principal components wherein (1) the polyolefin (a) is in the form of particles dispersed in the rubber and the average particle diameter of the polyolefin particles is at most 1 μm, and (2) the rubber and the polyolefin (a) are linked together via a silane coupling agent (c).

2. The resin-reinforced elastomer according to claim 1, wherein the rubber comprises a first rubber (b) and a second rubber (B); the content of said first rubber (b) is in the range of 20 to 250 parts by weight based on 100 parts by weight of the polyolefin (a); the content of said silane coupling (c) is in the range of 0.1 to 2.0 parts by weight based on 100 parts by weight of the polyolefin (a); and the content of said polyolefin (a) in the resin-reinforced elastomer is in the range of 1 to 40 parts by weight based on 100 parts by weight of the total sum of said first rubber (b) and said second rubber (B).

3. The resin-reinforced elastomer according to claim 1, wherein the polyolefin particles in the in-reinforced elastomer have an average particle diameter in the range of 0.01 to 1 μm.

4. The resin-reinforced elastomer according to claim 1, wherein the polyolefin (a) is at least one member selected from the group consisting of polyethylene, polypropylene and ethylene-propylene copolymers.

5. A process for producing a resin-reinforced elastomer which comprises the steps of melt kneading a polyolefin (a), a first rubber (b) and a silane coupling agent (c) to prepare a thermoplastic composition (A) having a constitution wherein the first rubber (b) is dispersed in the matrix of the polyolefin (a); and adding a second rubber (B) to the thermoplastic composition (A), while melt kneading the resultant mixture to subject the matrix of said thermoplastic composition (A) to phase transition and disperse the polyolefin (a) in a matrix consisting of the first rubber and the second rubber, wherein the content of said first rubber (b) is in the range of 20 to 250 parts by weight based on 100 parts by weight of the polyolefin (a); the content of said silane coupling agent (c) is in the range of 0.1 to 2.0 parts by weight based on 100 parts by weight of the polyolefin (a); and the content of said polyolefin (a) in the resin-reinforced elastomer is in the range of 1 to 40 parts by weight based on 100 parts by weight of the total sum of said first rubber (b) and said second rubber (B).

6. The process for producing a resin-reinforced elastomer according to claim 5, wherein the thermoplastic composition (A) has a melt flow index (MFI) in the range of 0.010 to 50 g/10 min. and a density in the range of 0.900 to 1.200 g/cm$^3$.

7. The process for producing a resin-reinforced elastomer according to any one of claims 5, or 6, wherein the polyolefin (a) is at least one member selected from the group consisting of polyethylene, polypropylene and ethylene-propylene copolymers.

8. A pneumatic tire which comprises a resin-reinforced elastomer used in its tread, said resin-reinforced elastomer being prepared by blending a second rubber (B) and a thermoplastic composition (A) which is obtained by melt kneading a polyolefin (a), a first rubber (b) and a silane coupling agent (c) and which has a constitution wherein the first rubber (b) is dispersed in the matrix of the polyolefin (a), so that the content of the polyolefin (a) falls within the range of 1 to 40 parts by weight based on 100 parts by weight of the total sum of the first rubber (b) and the second rubber (B).

9. The pneumatic tire according to claim 8, wherein the thermoplastic composition (A) has a chemical composition in which the content of the first rubber (b) is in the range of 20 to 250 parts by weight, and the content of the silane coupling agent (c) is in the range of 0.1 to 2.0 parts by weight each based on 100 parts by weight of the polyolefin (a).

10. The pneumatic tire according to claim 8, wherein the average particle diameter of the polyolefin (a) in the resin-reinforced elastomer is at most 1 μm.

11. The pneumatic tire according to any of claim 8, wherein the polyolefin (a) is at least one member selected from the group consisting of polyethylene, polypropylene and ethylene-propylene copolymers.

12. The process for producing a resin-reinforced elastomer as claimed in claim 5, further comprising melt kneading in the presence of an organic peroxide.

* * * * *